S. O. LARRABEE.
ARTIFICIAL BAIT.
APPLICATION FILED JUNE 2, 1913.
1,099,606.
Patented June 9, 1914.
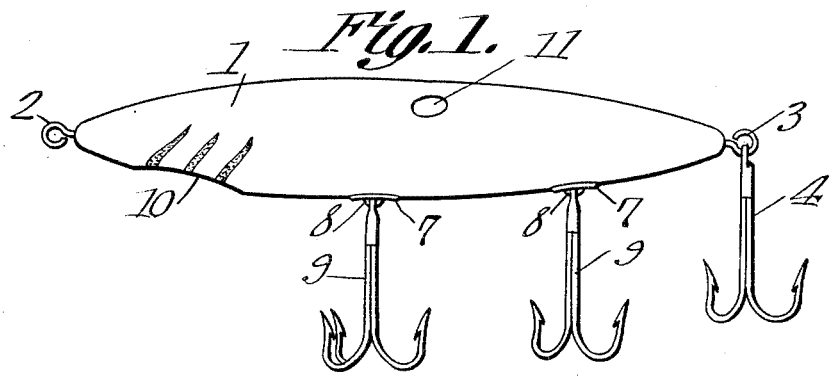
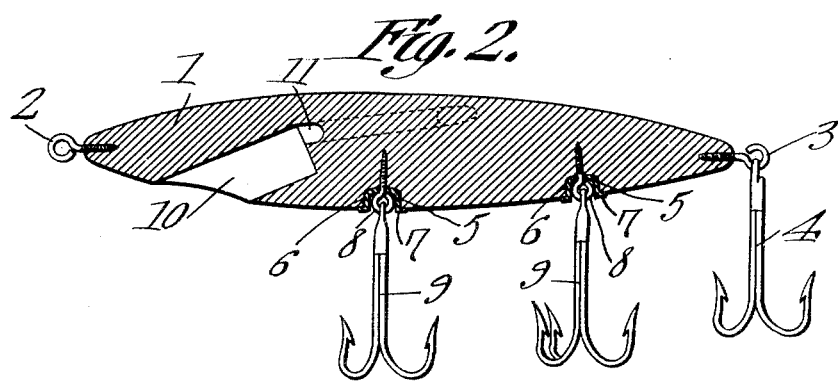
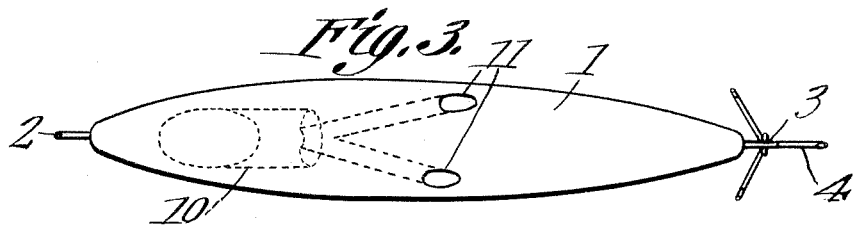
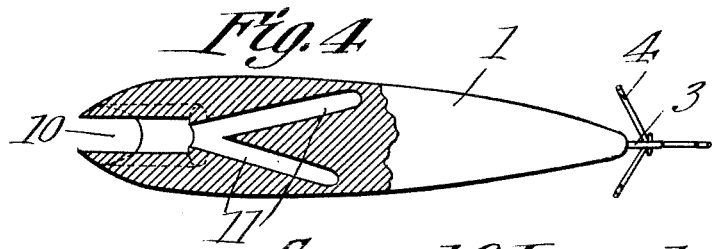
Samuel O. Larrabee,
Inventor
Witnesses
by C. A. Snow & Co.
Attorneys

UNITED STATES PATENT OFFICE.

SAMUEL O. LARRABEE, OF COLDWATER, MICHIGAN.

ARTIFICIAL BAIT.

1,099,606.　　　Specification of Letters Patent.　　Patented June 9, 1914.

Application filed June 2, 1913. Serial No. 771,356.

*To all whom it may concern:*

Be it known that I, SAMUEL O. LARRABEE, a citizen of the United States, residing at Coldwater, in the county of Branch and State of Michigan, have invented a new and useful Artificial Bait, of which the following is a specification.

The present invention appertains to an artificial bait or lure, and aims to provide a novel and improved device of that character.

It is the object of the present invention to provide a buoyant artificial bait or lure which will dive into and move under the surface of the water when drawn by the fishing line.

Another object of the present invention is to provide an artificial bait or lure of the nature indicated which shall simulate the movements of a minnow or live bait when drawn through the water.

A further object of the present invention is to provide a device of the character specified which shall be comparatively simple and inexpensive in construction, and which shall carry out the aforesaid functions in a highly efficient manner.

With the foregoing general objects outlined and with other objects in view, which will be apparent as the description proceeds, the present invention resides in the combination and arrangements of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the acompanying drawing, wherein:—

Figure 1 is a side elevation of the improved bait. Fig. 2 is a longitudinal central vertical section thereof. Fig. 3 is a plan or top view of the bait. Fig. 4 is a sectional view taken on the line 4—4 of Fig. 1.

In carrying out the invention, reference being had in detail to the drawing, there is provided a body 1, preferably turned from wood or other buoyant material, and of ovoid or fusiform contour. The body 1 may be suitably finished for enticing the larger fish, the body being made to resemble a minnow or other live bait.

An eye screw 2 is engaged to or threaded into the forward end of the body 1 for the attachment of a fishing line, while a similar screw 3 is threaded into the rear end or tail of the body 1 and has the trailing hook 4 attached thereto. The hook 4 is preferably of the treble or multiple type, and is designed to trail in rear of the body 1, as will be apparent.

The body 1 is provided in its bottom with a pair of recesses 5 at longitudinally spaced points, and pressed sheet metal sockets 6 are engaged within the recesses 5 and have the flanges 7 overlapping the surface of the body 1 so as to protect the edges of the recesses. Eye screws 8 are engaged through the sockets 6 and take into the body 1, the eyes of the said screws being disposed within the sockets 6 and have engaged thereto the hooks 9 which are preferably of the treble or multiple type. The hooks 9 are thus conveniently and efficiently attached to the bottom of the body 1, the eyes of the hooks and the eyes of the attaching screws 8 being disposed within the sockets 6. All of the hooks are thus loosely connected to the body so that they are free to move in various directions to snare the larger fish which interfere with or attempt to swallow the body 1.

The body 1 is provided with novel means for causing it to dive and move under the surface of the water, when the fishing line is drawn or jerked. To this end, a bore 10 is drilled into the body 1 from the bottom and adjoining the forward end to a point short of the back, the bore 10 being of relatively large diameter and extending obliquely or diagonally. The body 1 is further provided with a pair of bores 11 drilled thereinto from the back adjoining the respective sides to the inner end of the bore 10. The secondary or supplemental bores 11 converge from the respective sides of the body to the inner end of the main or primary bore 10, and are of relative small diameter, the bores 11 communicating with the upper portion of the bore 10. The bores 10 and 11 combine to provide a Y-shaped passage through the body of the bait leading from the bottom adjoining the forward end to the back intermediate the ends of the body. The bores 11, or what may be termed the branches of the passage through the body, are disposed at a less angle of inclination than the main bore 10, and the bores or branches 11 are of different lengths so as to terminate, or open through the back of the body, at points spaced longitudinally relative to the body, as clearly seen in Fig.

3. It will thus be seen that the bores or branches 11 open through the back of the body adjoining the respective sides and at diagonal points, for the purposes which will hereinafter appear. The bores 10 and 11 may be readily formed in the body 1, either before or after the body has been turned, the body being preferably turned from a block of wood, although this is not essential. The bores are each of uniform diameter throughout, in order that ordinary drills may be employed.

In use, the bait is attached to the fishing line by means of the eye screw 2, and is cast in the usual fashion. Ordinarily, the bait will float on the surface of the water, but when the fishing line is given a quick motion or jerk, the bait will dive quickly into the water, and as the line is drawn by the fishing pole or reel, the bait will move under the surface of the water and will also simulate the movements of a live minnow or bait. These actions of the bait are caused by the peculiar passage through the body of the bait, as above specified. It will be observed that the mouth of the passage or main bore 10 is disposed downwardly at the forward end of the body, and that the passage, as a whole, stands obliquely, or is inclined toward the rear, in order that when the body is drawn forwardly, by means of the fishing line, water will rush into the bore 10 and through the bores 11. The water in rushing or flowing through the passage diagonally upward, will cause the body to have a downward moving tendency, resulting in the sinking or lowering of the bait into the water as the bait is drawn forward. The bore 10 in being disposed at a relatively large angle of inclination will cause the body of the bait to descend into the water very quickly when the body is drawn, while the bores 11 in being disposed at a less or small angle of inclination will serve to increase the agitation of the body. The bores 10 and 11 being disposed at various angles relative to each other will also increase the resistance of the water passing through the passage provided by the said bores, the resistance of the water also being increased by the inner end of the bore 10, as will be apparent. The water in being discharged from the supplemental or secondary bores 11, or the branches of the passage, will tend to agitate the bait, or to cause the same to move sidewise to simulate the movements of a live minnow. The varying pressures of the two streams of the water passing through the passage will cause the body to be agitated or moved to resemble the movements of a live minnow, it being observed that the resistance offered by the longest bore 11 will be greater than that offered by the shortest bore 11, so that the water discharged from the shortest bore will have a pressure slightly greater than that issuing from the longest bore 11. This difference in the pressures of the streams of water issuing from the bores or branches 11 will cause the body to be moved sidewise, in order that the body will follow a tortuous or sinuous path in traveling through the water, to resemble that of the live minnow. The streams of water discharging from the branches 11 will also move in paths at small angles of inclination relative to the body 1, so as to greatly assist in agitating the body, while the bore 10 of the passage is disposed at a relatively large angle of inclination with respect to the body, so as to cause the body to dive quickly into the water when the body is drawn forward. The streams of water discharging from the bores or branches 11 will create side pressures, which will cause the body to have a relatively large or wide side movement.

In practice, it has been found that the present bait or lure may be made to float or dive at the will of the operator, by the simple manipulation of the fishing rod or reel thereof. The slightest twist or movement of the rod, or the turn of the wheel, will cause the bait to dive easily and quickly, and it has been found that when the bait is drawn through the water, the same will have a movement simulating the movement of a live minnow, especially that of a live minnow as when pursued by a large fish.

Particular attention is directed to the fact that the bore or main portion 10 of the Y-shaped passage extends approximately to the axis of the body along the vertical longitudinal median plane of the body, and that the branches or bores 11 diverge from the axis of the body toward the sides thereof. This is of advantage for the reason that the branches diverging from the axis of the body, will reduce to a minimum, the tendency for the body to spin or rotate about its axis, and will facilitate the lateral movement or agitation of the body. Importance is also attached to the fact that the plane of the axes of the branches 11 is disposed at a different angle of inclination than the axis of the main portion or bore 10 of the Y-shaped passage, inasmuch as the water will flow from the bore 10 through the bores 11 at different angles, so as to tend to slightly vibrate the body vertically. It may thus be said that the bores or branch passages 11 communicate through the bottom of the body and extend upwardly from the vertical longitudinal median plane of the body toward the sides thereof to give a lateral impulse to the body as the body is drawn through the water and to reduce to a minimum, the spinning or rotating tendency of the body.

As a consequence of the particular passage provided in the body of the bait, the bait will serve as a most attractive lure for the larger fish, and will efficiently carry out the functions desired.

Having thus described the invention, what is claimed as new is:—

1. A buoyant hook-carrying body having diagonal branch passages therein communicating through the bottom of the body and extending upwardly from the vertical longitudinal median plane of the body toward the sides thereof.

2. A buoyant hook-carrying body having diagonal branch passages therein communicating through the bottom of the body and extending upwardly from the vertical longitudinal median plane of the body toward the sides thereof, the said branch passages being of different lengths.

3. A buoyant hook-carrying body having diagonal branch passages therein communicating through the bottom of the body and extending upwardly from the vertical longitudinal median plane of the body toward the sides thereof, the branch passages opening through the top of the body at longitudinally spaced points.

4. A buoyant hook-carrying body having a diagonal Y-shaped passage therethrough, the branches of the passage being of different lengths.

5. A buoyant hook-carrying body having a diagonal Y-shaped passage therethrough, the branches of the passage opening through the top of the body at points spaced longitudinally.

6. A buoyant hook-carrying body having a main bore of relative large diameter drilled diagonally into the bottom thereof, and having supplemental bores drilled into the top thereof and converging to the inner end of the main bore.

7. A buoyant hook-carrying body having a main bore of relative large diameter drilled diagonally into the bottom thereof, and having a pair of supplemental bores drilled into the top thereof and converging to the inner end of the main bore, the supplemental bores being disposed at a different angle of inclination than the main bore.

8. A buoyant hook-carrying body having a main bore of relative large diameter drilled diagonally into the bottom thereof and having supplemental bores drilled diagonally into the top thereof, and converging to the inner end of the main bore, the supplemental bores being of different lengths.

9. A buoyant hook-carrying body having a diagonal Y-shaped passage therethrough, the main portion and branches of the passage being of relatively large and small diameters, the branches being disposed at a different angle of inclination than the main portion of the passage, and the branches being of different lengths.

10. A buoyant hook-carrying body having a diagonal Y-shaped passage therethrough, the main portion of the said passage extending approximately to the axis of the body and the branches of the passage diverging from the axis of the body toward the sides thereof.

11. A buoyant hook-carrying body having a diagonal Y-shaped passage therethrough, the main portion of the said passage extending approximately to the axis of the body and the branches of the passage diverging from the axis of the body toward the sides thereof, the plane of the axes of the said branches being disposed at a different angle of inclination than the axis of the main portion of the said passage.

In testimony that I claim the foregoing as my own, I have hereto affixed my signature in the presence of two witnesses.

SAMUEL O. LARRABEE.

Witnesses:
 ILAH GOWDY,
 STANLEY E. WEAGE.